(12) United States Patent
Jang

(10) Patent No.: US 12,431,521 B2
(45) Date of Patent: Sep. 30, 2025

(54) METHOD FOR CONTROLLING MULTIPLE FUEL CELLS OF FUEL CELL VEHICLE

(71) Applicants: HYUNDAI MOTOR COMPANY, Seoul (KR); KIA CORPORATION, Seoul (KR)

(72) Inventor: Sang Pil Jang, Anyang-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 513 days.

(21) Appl. No.: 17/972,108

(22) Filed: Oct. 24, 2022

(65) Prior Publication Data
US 2023/0378503 A1    Nov. 23, 2023

(30) Foreign Application Priority Data
May 17, 2022    (KR) .................. 10-2022-0060174

(51) Int. Cl.
*H01M 8/04*    (2016.01)
*H01M 8/04537*    (2016.01)
*H01M 8/04858*    (2016.01)

(52) U.S. Cl.
CPC ..... *H01M 8/0494* (2013.01); *H01M 8/04559* (2013.01); *H01M 2250/20* (2013.01)

(58) Field of Classification Search
CPC ........... H01M 8/0494; H01M 8/04559; H01M 2250/20
USPC ....................................................... 429/432
See application file for complete search history.

(56) References Cited

U.S. PATENT DOCUMENTS

| | | | |
|---|---|---|---|
| 7,326,480 B2 | 2/2008 | Fuglevand | |
| 2008/0107933 A1* | 5/2008 | Gallagher | H01M 8/04753 429/432 |
| 2011/0129749 A1 | 6/2011 | Reiser | |
| 2015/0188160 A1 | 7/2015 | Lee | |
| 2018/0219238 A1* | 8/2018 | Tanaka | H01M 8/04302 |

(Continued)

FOREIGN PATENT DOCUMENTS

| | | |
|---|---|---|
| JP | 2007-012429 A | 1/2007 |
| JP | 2007-042477 A | 2/2007 |
| JP | 2015-122320 A | 7/2015 |

(Continued)

*Primary Examiner* — James M Erwin
(74) *Attorney, Agent, or Firm* — MCDONNELL BOEHNEN HULBERT & BERGHOFF LLP

(57) ABSTRACT

A method for controlling multiple fuel cells of a fuel cell vehicle includes equally controlling, by a controller, power generation amounts of the respective fuel cells, deriving, by the controller, differences between output voltages of the respective fuel cells in a state in which the power generation amounts of the respective fuel cells are equal and determining whether or not differential control of the power generation amounts of the respective fuel cells is required based on the differences between the output voltages, correcting, by the controller, power generation control values of the respective fuel cells depending on the differences between the output voltages upon determining that differential control of the power generation amounts of the respective fuel cells is required, and differentially controlling, by the controller, the power generation amounts of the respective fuel cells depending on the corrected power generation control values.

12 Claims, 7 Drawing Sheets

(56) References Cited

U.S. PATENT DOCUMENTS

2020/0020964 A1*  1/2020  Pmsvvsv ........... H01M 8/04679

FOREIGN PATENT DOCUMENTS

| JP | 2021-136103 A | 9/2021 |
| KR | 2008-0056047 A | 6/2008 |
| KR | 2012-0136819 A | 12/2012 |

* cited by examiner

METHOD FOR CONTROLLING MULTIPLE FUEL CELLS OF FUEL CELL VEHICLE

CROSS REFERENCE TO RELATED APPLICATIONS

This application claims priority from Korean Patent Application No. 10-2022-0060174, filed on May 17, 2022, in the Korean Intellectual Property Office, the entire disclosure of which is incorporated herein by reference in its entirety.

BACKGROUND

1. Field of the Disclosure

The present disclosure relates to a method for controlling multiple fuel cells of a fuel cell vehicle, and more particularly, to a method for controlling multiple fuel cells of a fuel cell vehicle in which power generation amounts of the respective fuel cells may be differentially controlled based on differences between progression degrees of deterioration of the respective fuel cells.

2. Description of the Related Art

In general, a fuel cell is a device that generates electric energy through electrochemical reactions in a fuel cell stack using hydrogen and air supplied from the outside, and may be used as a power supply for driving a motor in eco-friendly vehicles, such as a fuel cell electric vehicle (FCEV).

A fuel cell system mounted in a fuel cell vehicle includes a fuel cell stack in which a plurality of fuel cells used as a power source is stacked, a fuel supply system configured to supply hydrogen as fuel to the fuel cell stack, an air supply system configured to supply oxygen as an oxidizer necessary for the electrochemical reactions, and a thermal management system configured to control the temperature of the fuel cell stack using a coolant or the like.

Concretely, in a polymer electrolyte membrane fuel cell (PEMFC) having a high power density, a membrane-electrode assembly (MEA), which is a core element, is located at the innermost region of the PEMFC, the MEA includes a solid polymer electrolyte membrane capable of moving protons, a cathode (referred to as an air electrode) and an anode (referred to as a fuel electrode), which are electrode layers coated with catalysts so that hydrogen and oxygen may react with each other therethrough, and provided on both surfaces of the electrolyte membrane.

As the fuel cell is used for a long period of time, the inner elements of the fuel cell are deteriorated, in the same manner as in a general high voltage battery. When the fuel cell is deteriorated, a power generation voltage value or a power generation output value is reduced at the same current, and thus, output instability and system shut-down may occur due to voltage drop in the maximum output section.

Such deterioration of the fuel cell restricts the lifespan of the fuel cell, and is thus the most important factor to be considered in manufacture of a fuel cell vehicle.

Recently, various deterioration diagnostic systems and methods for fuel cells are being applied, and Patent Document 1 (KR 10-2012-0136819 A) discloses a deterioration diagnostic system and method for fuel cells.

Among commercial fuel cell vehicles which are being mass-produced now, multiple (two or more) fuel cells are mounted in vehicles requiring high output (for example, a city bus, a truck, an express bus, etc.).

In these commercial fuel cell vehicles, when at least one of the multiple fuel cells is deteriorated so as to be replaced, the entirety of the multiple fuel cells should be replaced, and thus, it is necessary to similarly adjust the degrees of deterioration of the respective fuel cells.

Accordingly, equal control that equally controls the power generation outputs of the respective fuel cells has conventionally been performed. However, even though the power generation outputs of the respective fuel cells are equally controlled, there may be differences in progression degrees of deterioration of the respective fuel cells for various reasons, such as differences between normal loads of the respective fuel cells, fabrication deviations of unit cells in the fuel cell stack, deviations of used materials, etc.

When equal control is continuously performed in spite of differences in progression degrees of deterioration of the respective fuel cells, the amount of current drawn from a fuel cell having a relatively high progression degree of deterioration is continuously increased, and thus deterioration of the corresponding fuel cell is further accelerated.

Therefore, technology that equally manages progression speeds of deterioration of respective fuel cells by determining differences between progression degrees of deterioration of the respective fuel cells is required.

The above information disclosed in the Background section is only for enhancement of understanding of the background of the invention and should not be interpreted as conventional technology that is already known to those skilled in the art.

SUMMARY

Therefore, the present disclosure has been made in view of the above problems, and it is an object of the present disclosure to provide a method for controlling multiple fuel cells of a fuel cell vehicle in which progression speeds of deterioration of the respective fuel cells are equally controlled through differential control of power generation amounts of the respective fuel cells based on progression degrees of deterioration of the respective fuel cells, so as to improve endurance lives of the respective fuel cells.

In accordance with an aspect of the present disclosure, the above and other objects can be accomplished by the provision of a method for controlling multiple fuel cells of a fuel cell vehicle, the method including equally controlling, by a controller, power generation amounts of the respective fuel cells, deriving, by the controller, differences between output voltages of the respective fuel cells in a state in which the power generation amounts of the respective fuel cells are equal, and determining whether or not differential control of the power generation amounts of the respective fuel cells is required based on the differences between the output voltages of the respective fuel cells, correcting, by the controller, power generation control values of the respective fuel cells depending on the differences between the output voltages of the respective fuel cells, upon determining that differential control of the power generation amounts of the respective fuel cells is required, and differentially controlling, by the controller, the power generation amounts of the respective fuel cells depending on the corrected power generation control values.

In the equally controlling the power generation amounts of the respective fuel cells, the controller may set the power generation control values of the respective fuel cells to the same value, and may equally control the power generation amounts of the respective fuel cells depending on the set power generation control value.

In the determining whether or not differential control of the power generation amounts of the respective fuel cells is required, the controller may determine that the power generation amounts of the respective fuel cells are in an equal state, when differences between actual power generation amounts of the respective fuel cells are within a predetermined reference range.

In the determining whether or not differential control of the power generation amounts of the respective fuel cells is required, the controller may determine that the power generation amounts of the respective fuel cells are in an equal state, when differences between actual power generation amounts of the respective fuel cells and the power generation control values thereof are within a predetermined error range.

In the determining whether or not differential control of the power generation amounts of the respective fuel cells is required, the controller may determine that differential control of the power generation amounts of the respective fuel cells is required, when the differences between the output voltages of the respective fuel cells exceed a predetermined reference value.

In the determining whether or not differential control of the power generation amounts of the respective fuel cells is required, the controller may maintain the current set power generation control value, upon determining that differential control of the power generation amounts of the respective fuel cells is not required.

In the correcting the power generation control values of the respective fuel cells depending on the differences between the output voltages of the respective fuel cells, the controller may determine differences between deterioration degrees of the respective fuel cells through comparison between the output voltages of the respective fuel cells, and may correct the power generation control values of the respective fuel cells depending on the differences between the deterioration degrees of the respective fuel cells.

In the correcting the power generation control values of the respective fuel cells depending on the differences between the output voltages of the respective fuel cells, the controller may determine a fuel cell having high output voltage as having a low deterioration degree, and determines a fuel cell having low output voltage as having a high deterioration degree.

In the correcting the power generation control values of the respective fuel cells depending on the differences between the output voltages of the respective fuel cells, the controller may derive a correction value based on results of comparison between the output voltages of the respective fuel cells, and may correct the power generation control values of the respective fuel cells based on the derived correction value.

The multiple fuel cells may be two fuel cells and, in the correcting the power generation control values of the respective fuel cells depending on the differences between the output voltages of the respective fuel cells, the correction value may be derived as a proportion of a difference between output voltages of the two fuel cells to a total available output voltage of the two fuel cells.

The multiple fuel cells may be two fuel cells and, in the correcting the power generation control values of the respective fuel cells depending on the differences between the output voltages of the respective fuel cells, the controller may derive a first power generation control value by correcting the power generation control value of one fuel cell based on the derived correction value as a corrected power generation control value of the corresponding fuel cell, and derives a corrected power generation control value of a remaining fuel cell by subtracting the first power generation control value from a total target output of the fuel cells.

In the differentially controlling the power generation amounts of the respective fuel cells, the controller may maintain the corrected power generation control values of the respective fuel cells for a predetermined reference time.

The method may further include re-determining whether or not differential control of the power generation amounts of the respective fuel cells is required, when differences between actual power generation amounts of the respective fuel cells and the corrected power generation control values thereof are within a predetermined error range, after the differentially controlling the power generation amounts of the respective fuel cells.

BRIEF DESCRIPTION OF THE FIGURES

The above and other objects, features and other advantages of the present disclosure will be more clearly understood from the following detailed description taken in conjunction with the accompanying drawings, in which.

DETAILED DESCRIPTION

Reference will now be made in detail to exemplary embodiments of the present disclosure, examples of which are illustrated in the accompanying drawings. Wherever possible, the same reference numbers will be used throughout the drawings to refer to the same or like parts.

In the following description of the embodiments, the terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

In addition, terms, such as "first" and "second", are used only to describe various elements, and these elements should not be construed as being limited by these terms. These terms are used only to distinguish one element from other elements. For example, a first element described hereinafter may be termed a second element, and similarly, a second element described hereinafter may be termed a first element, without departing from the scope of the disclosure.

Hereinafter, the configurations and the operating principles of the various embodiments of the present disclosure will be described with reference to the accompanying drawings.

Figure 1:
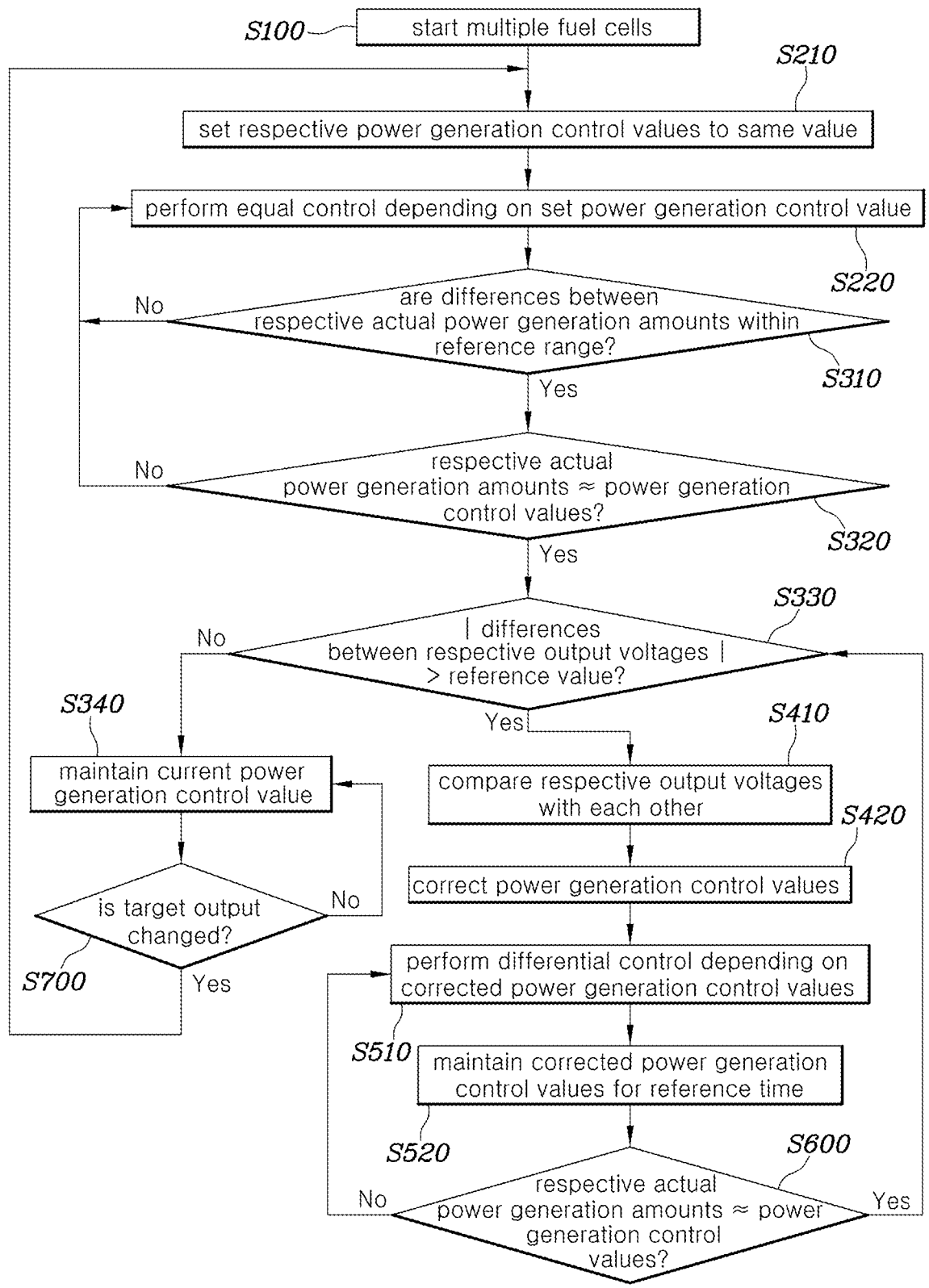
FIG. 1 is a flowchart representing a method for controlling multiple fuel cells of a fuel cell vehicle according to one embodiment of the present disclosure.
Figure 2A:
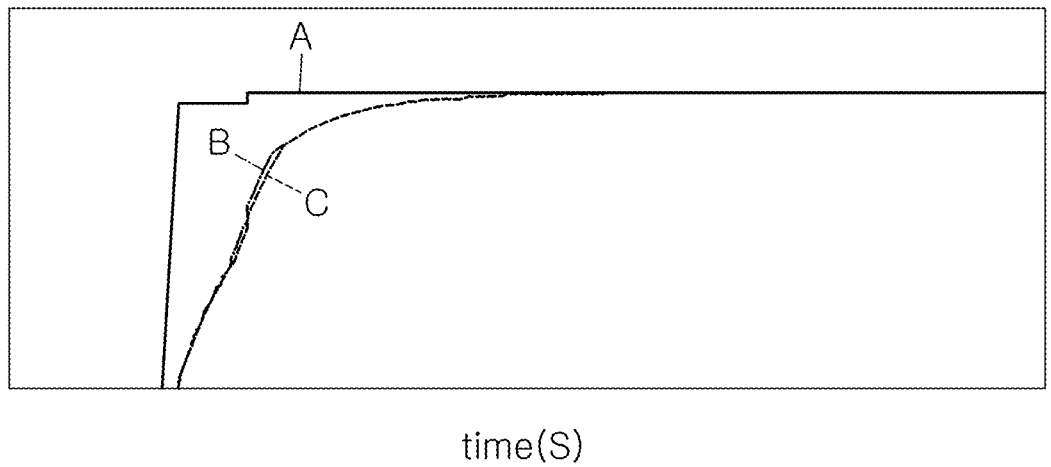
FIGS. 2A, 2B, and 2C are graphs showing power generation amounts, voltages and power generation rates of respective fuel cells over time, in the case in which conventional equal control of multiple fuel cells is applied.
Figure 2B:
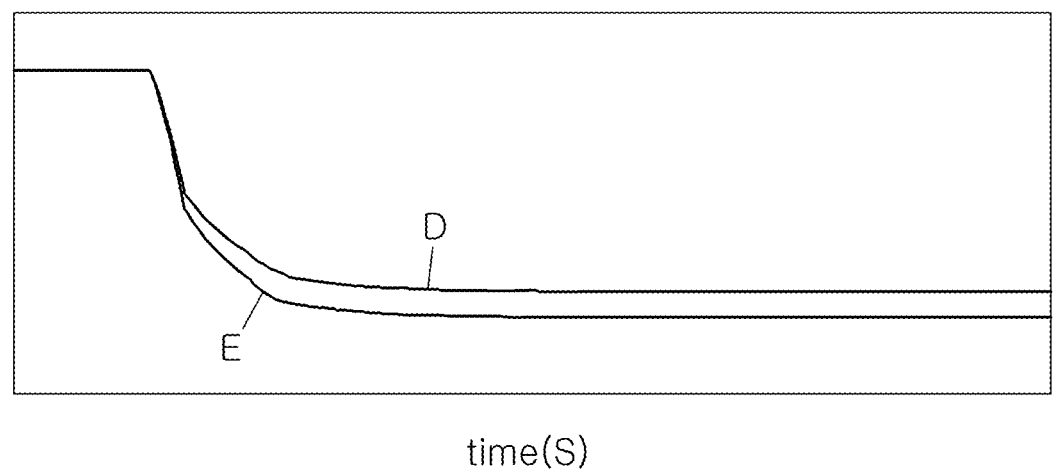
Figure 2C:
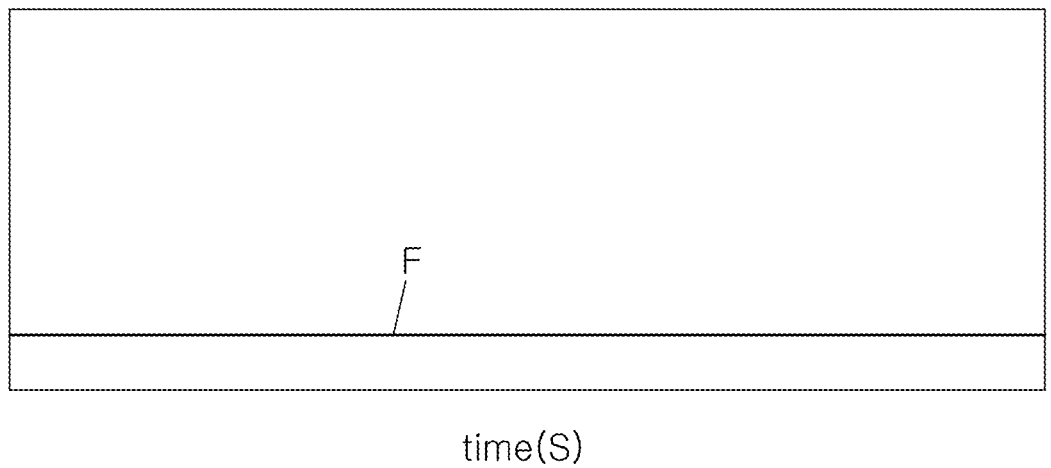
Figure 3A:
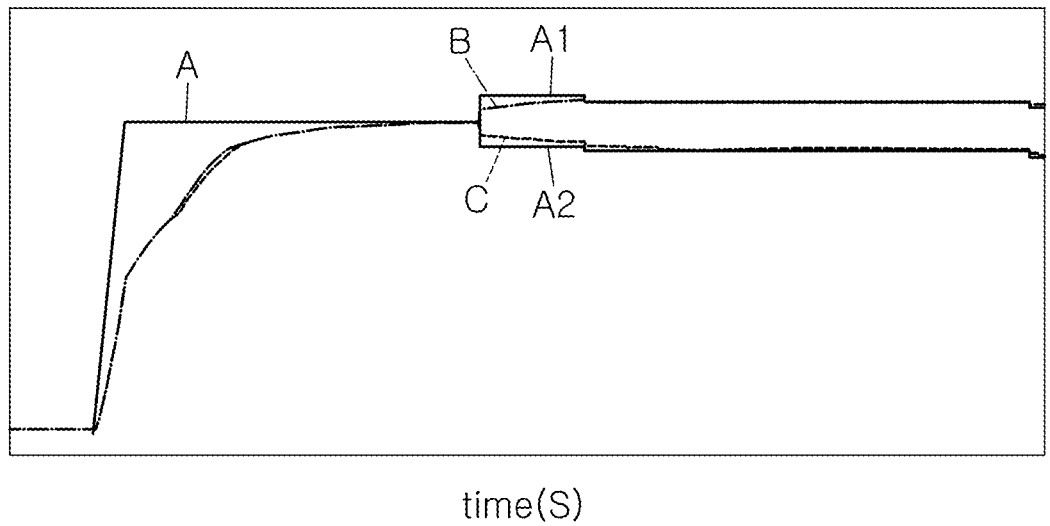
FIGS. 3A, 3B, and 3C are graphs showing power generation amounts, voltages and power generation rates of respective fuel cells over time, in the case in which differential control of multiple fuel cells according to the present disclosure is applied.
Figure 3B:
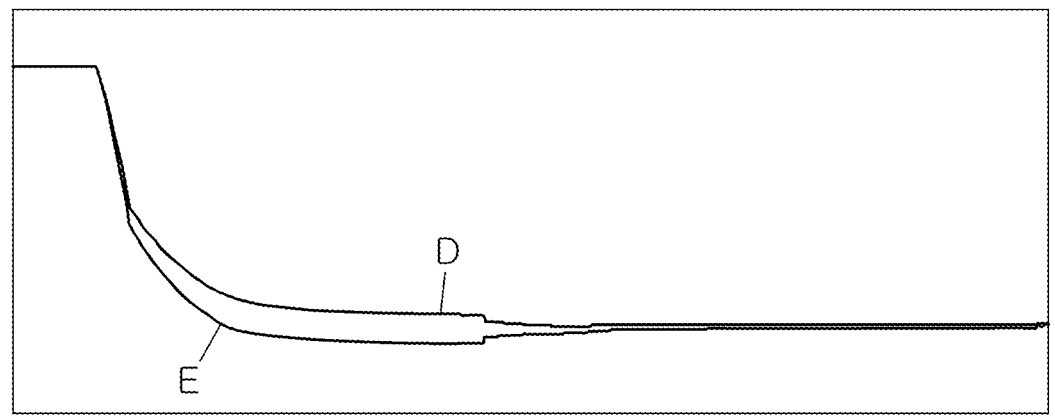
Figure 3C:
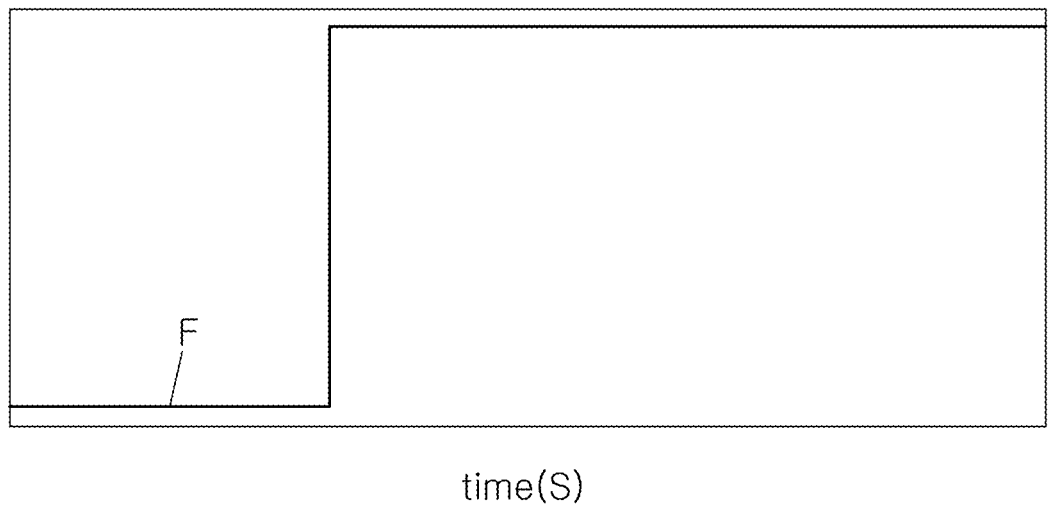
Figure 4:
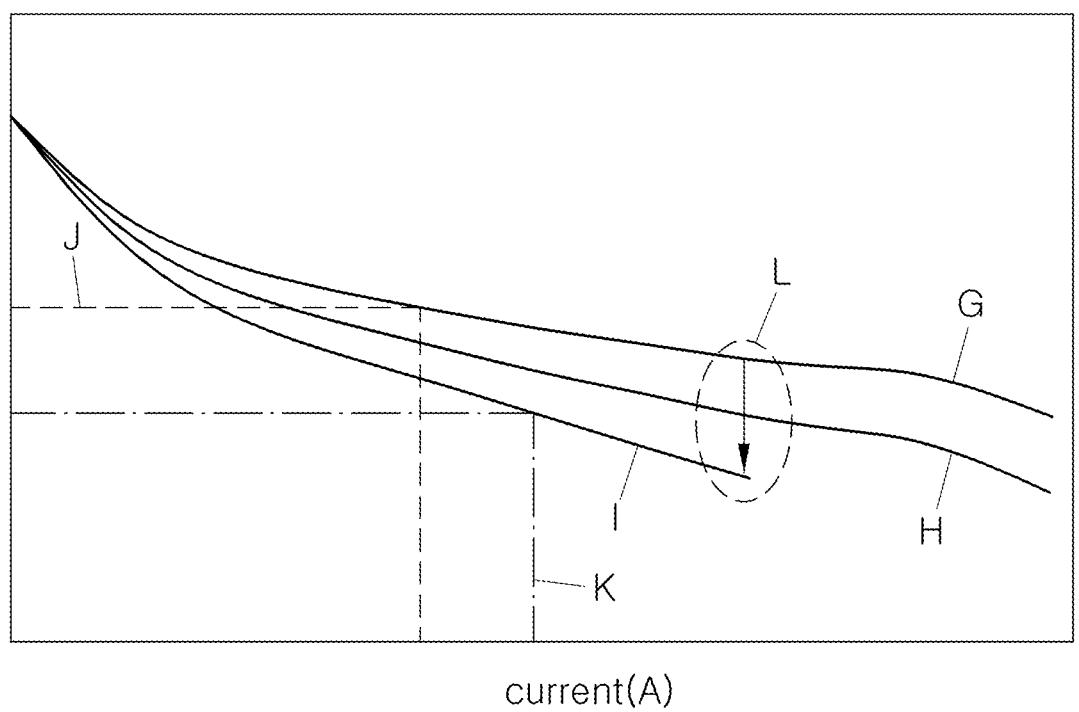
FIG. 4 is a graph schematically showing drop of output voltages of multiple fuel cells at the same current depending on differences between progression degrees of deterioration of the respective fuel cells.
Figure 5A:
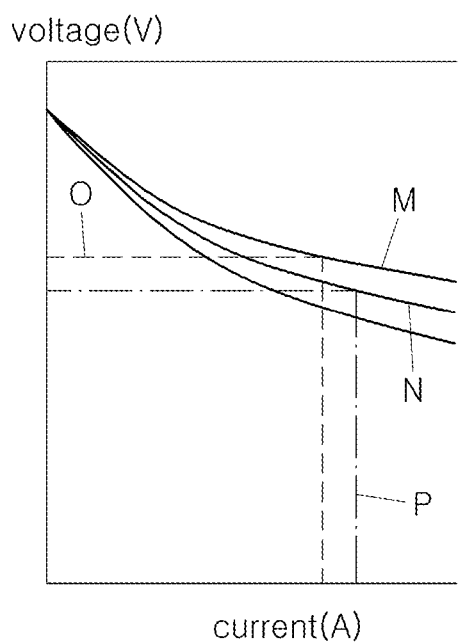
FIGS. 5A and 5B are graphs schematically showing differences between power generation amounts of the multiple fuel cells depending on the differences between the progression degrees of deterioration of the respective fuel cells, in the case in which differential control according to the present disclosure is applied.
Figure 5B:
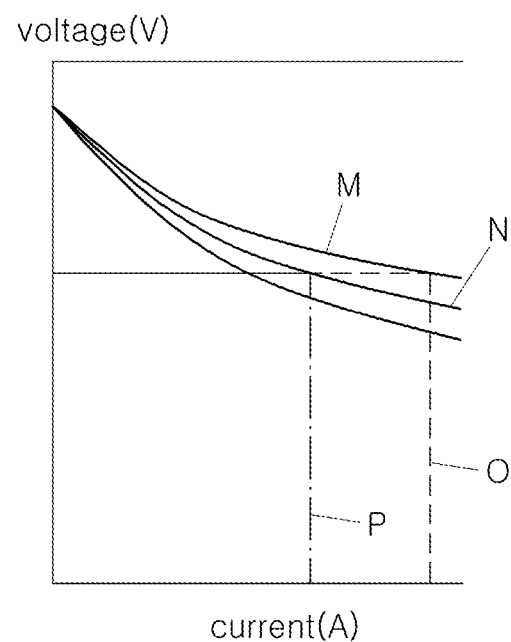

FIG. 1 is a flowchart representing a method for controlling multiple fuel cells of a fuel cell vehicle according to one embodiment of the present disclosure, FIGS. 2A to 2C are graphs showing power generation amounts, voltages and power generation rates of respective fuel cells over time, in the case in which conventional equal control of multiple fuel cells is applied, FIGS. 3A to 3C are graphs showing power generation amounts, voltages and power generation rates of respective fuel cells over time, in the case in which differential control of multiple fuel cells according to the present disclosure is applied, FIG. 4 is a graph schematically showing drop of output voltages of multiple fuel cells at the same current depending on differences between progression degrees of deterioration of the respective fuel cells, and FIGS. 5A and 5B are graphs schematically showing differences between power generation amounts of the multiple fuel cells depending on the differences of the progression degrees of deterioration of the respective fuel cells, in the case in which differential control according to the present disclosure is applied.

Referring to FIG. 1, a method for controlling multiple fuel cells of a fuel cell vehicle according to one embodiment of the present disclosure includes equally controlling, by a controller, power generation amounts of the respective fuel cells (S210 and S220), deriving, by the controller, differences between output voltages of the respective fuel cells in the state in which the power generation amounts of the respective fuel cells are equal, and determining whether or not differential control of the power generation amounts of the respective fuel cells is required based on the differences between the output voltages of the respective fuel cells (S310, S320, S330 and S340), correcting, by the controller, power generation control values of the respective fuel cells depending on the differences between the output voltages of the respective fuel cells upon determining that differential control of the power generation amounts of the respective fuel cells is required (S410 and S420), and differentially controlling, by the controller, the power generation amounts of the respective fuel cells depending on the corrected power generation control values (S510 and S520).

The controller according to one exemplary embodiment of the present disclosure may be implemented through a non-volatile memory (not shown) configured to store an algorithm configured to control operations of various elements of a vehicle or data regarding software commands for reproducing the algorithm and a processor (not shown) configured to perform operations which will be described below using data stored in the corresponding memory. Here, the memory and the processor may be implemented as individual chips. Alternatively, the memory and the processor may be implemented as a single integrated chip. The processor may be provided in the form of one or more processors.

In the method according to one embodiment of the present disclosure, it is assumed that a fuel cell vehicle is a fuel cell vehicle requiring a relatively high output, in which multiple fuel cells, i.e., at least two fuel cells, are mounted.

As described above in the description in the related art, when one or more fuel cells are deteriorated enough to be replaced in the fuel cell in which the multiple cells are mounted, all the fuel cells including a relatively less deteriorated fuel cell are replaced, and thus, unnecessary maintenance costs may be incurred.

Therefore, the method according to the present disclosure includes equally controlling, by the controller, the power generation amounts of the respective fuel cells (S210 and S220), so as to similarly control the progression degrees of deterioration of the respective fuel cells.

Although the power generation amounts of the respective fuel cells are equally controlled, there may be differences between the progression degrees of deterioration of the respective fuel cells for reasons, such as differences between normal loads of the respective fuel cells, fabrication deviations of unit cells in a fuel cell stack, deviations of used materials, etc.

Further, when equal control is continuously performed in the state in which there are differences between the progression degrees of deterioration of the respective fuel cells, deterioration of a fuel cell having a relatively high progression degree of deterioration is accelerated, and thus, there are differences between progression speeds of deterioration of the respective fuel cells.

Therefore, the method according to the present disclosure includes deriving, by the controller, the differences between the output voltages of the respective fuel cells in the state in which the power generation amounts of the respective fuel cells are equal, and determining whether or not differential control of the power generation amounts of the respective fuel cells is required based on the differences between the output voltages of the respective fuel cells (S310, S320, S330 and S340), correcting, by the controller, the power generation control values of the respective fuel cells depending on the differences between the output voltages of the respective fuel cells upon determining that differential control of the power generation amounts of the respective fuel cells is required (S410 and S420), and differentially controlling, by the controller, the power generation amounts of the respective fuel cells depending on the corrected power generation control values (S510 and S520), thereby uniformly managing the progression speeds of deterioration of the respective fuel cells.

Concretely, the deriving, by the controller, the differences between the output voltages of the respective fuel cells in the state in which the power generation amounts of the respective fuel cells are equal and determining whether or not differential control of the power generation amounts of the respective fuel cells is required based on the differences between the output voltages of the respective fuel cells (S310, S320, S330 and S340) may include confirming whether or not the power generation amounts of the respective fuel cells correspond to an equal state (S310 and S320), and determining whether or not differential control of the power generation amounts of the respective fuel cells is required (S330 and S340).

Prior to a concrete description of this operation, the basic operating principle of a method for controlling, by the controller, the power generation amounts of the fuel cells according to the present disclosure is first described.

Basically, in the controller according to the present disclosure, power generation control values for controlling the power generation amounts of the fuel cells may be set. It will be understood that the power generation control value indicates a value acquired by multiplying the total target output (or demanded output) of the fuel cells by the power generation rate of each fuel cell.

Here, it will be understood that the total target output of the fuel cells is the total demanded output calculated by summing demanded output for driving set by pedal force applied by a user of the fuel cell vehicle and demanded output for vehicle accessories.

Further, the power generation rates of the respective fuel cells are percentages (%) of the proportions of the outputs which are individually generated by the respective fuel cells to the total target output of the fuel cells. For example, in the case in which the power generation amounts of two fuel cells are equally controlled, the power generation control values of the respective fuel cells are set such that each of the respective fuel cells generates 50% of the total target output of the fuel cells.

That is, the power generation control value of each fuel cell will be understood as a control value configured to control power. Power is expressed as the product of voltage and current, and thus, when current is changed in the state in which power is constant, voltage is also changed.

In more detail, when the controller according to the present disclosure set the power generation control value, a current production amount (amount of reaction between hydrogen and oxygen) is adjusted depending on the power generation control value, and power is generated. When the current production amount is increased, voltage is decreased.

The method according to the present disclosure is executed to determine whether or not differential control of the power generation amounts of the respective fuel cells is required using differences between voltages generated from the fuel cells due to changes in the current production amounts adjusted depending on the power generation control values.

Although, the same power generation control value is set, the output voltages of the fuel cells may be changed depending on the progression states of deterioration of the fuel cells. This will be described with reference to FIG. 4.

FIG. 4 is a graph schematically showing drop of output voltages of multiple fuel cells at the same current depending on differences between progression degrees of deterioration of the respective fuel cells.

In FIG. 4, G indicates a current-voltage curve of a fuel cell in an initial state, H is a current-voltage curve of a fuel cell which is deteriorated but is still usable, and I is a current-voltage curve of a fuel cell which is deteriorated and needs to be replaced.

Here, the fuel cell in the initial state means a fuel cell at the beginning of life (BOL) which is not deteriorated, the fuel cell which is deteriorated and needs to be replaced means a fuel cell after the end of life (EOL), and the fuel cell which is deteriorated but is still usable means a fuel cell at the middle of life (MOL) which is in progress from the BOL to the EOL.

Further, in FIG. 4, region J indicates the power generation output (or the power production amount) of the fuel cell at the BOL, and region K indicates the power generation output (or the power generation amount) of the fuel cell at the EOL. Here, the areas of the respective regions J and K are the same.

That is, it may be confirmed that the fuel cell at the EOL requires higher current so as to exhibit the same power generation output, compared to the fuel cell at the BOL.

The reason for this is that, as deterioration of a fuel cell progresses, a power generation voltage value drops at the same current, as described above. Such voltage drop is represented in region L in FIG. 4.

Consequently, although the power generation outputs of the respective fuel cells are equalized by setting the same power generation control value, the output voltages of the fuel cells may be changed depending on the deterioration states of the fuel cells. Therefore, the method according to the present disclosure is executed to determine whether or not differential control of the power generation amounts of the respective fuel cells is required based on the differences between the changed output voltages of the respective fuel cells (S330 and S340).

The reason why, prior to determining whether or not differential control of the power generation amounts of the respective fuel cells is required (S330 and S340), whether or not the power generation amounts of the respective fuel cells correspond to the equal state is confirmed (S310 and S320) will be described below.

Although the deterioration states of the fuel cells may be determined through various methods, in the present disclosure, the states of deterioration of the fuel cells are determined based on voltage drop occurring depending on the progression degrees of deterioration of the fuel cells.

That is, in the state in which the power generation outputs of the respective fuel cells are equal, it is determined that deterioration of a fuel cell is considerably advanced when the output voltage of the fuel cell is low, and it is determined that deterioration of the fuel cell is relatively less advanced when the output voltage of the fuel cell is high.

That is, only when voltage differences are confirmed in the state in which the powers of the respective fuel cells are equal, differences between the progression degrees of deterioration of the respective fuel cells may be accurately determined.

Therefore, the method according to the present disclosure includes confirming whether or not the power generation amounts of the respective fuel cells correspond to the equal state (S310 and S320), prior to determining whether or not differential control of the power generation amounts of the respective fuel cells is required (S330 and S340).

Subsequently, in correcting the power generation control values of the respective fuel cells depending on the differences between the output voltages of the respective fuel cells (S410 and S420), upon determining that differential control of the power generation amounts of the respective fuel cells is required, the controller according to the present disclosure corrects the power generation control values so as to decrease the power generation amount of a fuel cell, deterioration of which is relatively more advanced, and to increase the power generation amount of a fuel cell, deterioration of which is relatively less advanced.

Here, the sum total of the power generation amounts of all the fuel cells remains constant, and thus, the target output may still be secured even though the power generation control values are corrected. This will be described with reference to FIGS. 5A and 5B.

FIGS. 5A and 5B are graphs schematically showing differences between the power generation amounts of the multiple fuel cells depending on the differences of the progression degrees of deterioration of the respective fuel cells, in the case in which differential control according to the present disclosure is applied.

In FIGS. 5A and 5B, M indicates a part of a current-voltage curve of a fuel cell, deterioration of which is relatively less advanced, and N indicates a part of a current-voltage curve of a fuel cell, deterioration of which is relatively more advanced.

Further, in FIGS. 5A and 5B, region O indicates the power generation output (or the power production amount) of the fuel cell, deterioration of which is relatively less advanced, and region P indicates the power generation output (or the power production amount) of the fuel cell, deterioration of which is relatively more advanced. Here, the areas of the respective regions O and P are the same.

In addition, the graph shown in FIG. 5A represents the case in which the power generation amounts of the respective fuel cells are equally controlled, and it may be confirmed that output voltages of the fuel cells drop at the same current depending on the progression degrees of deterioration of the respective fuel cells, in the same manner as in FIG. 4

On the other hand, the graph shown in FIG. 5B represents the case in which differential control according to the present disclosure is applied, and it may be confirmed that the power generation amounts of the respective fuel cells are differentially controlled so as to increase the power generation output (or the power production amount) of the fuel cell, deterioration of which is relatively less advanced (the area of the region O being increased), and to decrease the power generation output (or the power production amount) of the fuel cell, deterioration of which is relatively more advanced (the area of the region P being decreased).

Here, the sum of the areas of region O and region P in the case in which the power generation amounts of the respective fuel cells are equally controlled (in FIG. 5A) is the same as the sum of the areas of region O and region P in the case in which the power generation amounts of the respective fuel cells are differentially controlled (in FIG. 5B).

That is, although differential control is executed by correcting the power generation control values of the respective fuel cells, the sum total of the power generation amounts of all the fuel cells remains constant, and the target output required by the user of the fuel cell vehicle may still be secured.

Further, the controller differentially controls the power generation amounts of the respective fuel cells depending on the corrected power generation control values (S510 and S520), so as to decrease use of the fuel cell having a high progression degree of deterioration and to increase use of the fuel cell having a low progression degree of deterioration, thereby being capable of uniformly managing the progression speeds of deterioration of the respective fuel cells.

Hereinafter, discriminatory characteristics of the respective operations in the method according to the present disclosure will be described in more detail with reference to FIGS. 1 to 3C.

In equally controlling the power generation amounts of the multiple fuel cells (S210 and S220) in the method according to the preset disclosure, the controller may set the power generation control values of the respective fuel cells to the same value (S210), and may equally control the power generation amounts of the respective fuel cells depending on the set power generation control value (S220).

As described above, the power generation control value is a value acquired by multiplying the total target output of the fuel cells by the power generation rate of each fuel cell, and corresponds to a control value for controlling power expressed as the product of voltage and current.

That is, the same power generation control value is set, and the power generation amounts of the respective fuel cells are controlled depending on the power generation control value, thereby being capable of equally controlling the power production amounts of the respective fuel cells. This will be described with reference to FIGS. 2A to 2C.

FIGS. 2A to 2C are graphs showing power generation amounts, voltages and power generation rates of respective fuel cells over time, in the case in which conventional equal control of multiple fuel cells is applied. For reference, FIGS. 2A to 2C are illustrated assuming that two fuel cells are provided, and this configuration is provided only for enhancement of understanding of particular example embodiments of the present disclosure, and is not intended to be limiting.

In the graph shown in FIG. 2A, A is a curve representing relationships between a power generation amount and time depending on a power generation control value, and B and C are curves representing actual power generation amount changes of the respective fuel cells over time.

Further, in the graph shown in FIG. 2B, D is a curve representing the voltage change of one fuel cell over time over time, and E is a curve representing the voltage change of the other fuel cell over time.

In addition, in the graph shown in FIG. 2C, F is a curve representing the power generation rates of the respective fuel cells. For reference, times in the respective graphs are independently changed, and it may be preferably understood that times in the respective graphs do not relate to each other, and individually elapse.

First, referring to the graph shown in FIG. 2A, the power generation control values of the respective fuel cells are set to the same value (in curve A), and the power generation amounts of the respective fuel cells are changed to track the set power generation control value as time passes (in curves B and C).

Here, referring to the graph shown in FIG. 2C, the power generation rates of the respective fuel cells remain the same without any change. As described above, the power generation rates of the respective fuel cells are percentages (%) of the proportions of the power generation outputs which are individually generated by the respective fuel cells to the total target output of the fuel cells. For example, the power generation rates of two fuel cells for equal control are 50%.

Further, since the power generation control value indicates a value acquired by multiplying the total target output (or demanded output) of the fuel cells by the power generation rate of each fuel cell, the power generation rates of the respective fuel cells are set to the same value, and thus, the power generation control values of the respective fuel cells are also set to the same value.

Consequently, the power production amounts of the respective fuel cells may be equally controlled by controlling the power generation amounts of the respective fuel cells depending on the same power generation control value and, when the power production amounts of the respective fuel cells are controlled to be the same, the frequencies of use or the degrees of use of the respective fuel cells are the same, and thus, the progression degrees of deterioration of the respective fuel cells depending on use thereof may be similarly adjusted.

For reference, referring to FIG. 2B, it may be confirmed that there are differences between the output voltages of the respective fuel cells.

That is, although the respective fuel cells are equally controlled, the output voltages of the respective fuel cells may drop at the same current depending on differences between the progression degrees of deterioration and the deterioration speeds of the respective fuel cells, for various reasons (i.e., voltage drop).

Therefore, in order to appropriately respond to such voltage drop, the method according to the present disclosure may include differentially controlling the power generation amounts of the respective fuel cells by determining whether or not differential control is required, in addition to equally controlling the power generation amounts of the respective fuel cells, as described below.

Subsequently, the operation of determining whether or not differential control of the power generation amounts of the respective fuel cells is required (S310, S320, S330 and S340) in the method according to the present disclosure will be described.

In determining whether or not differential control of the power generation amounts of the respective fuel cells is required (S310, S320, S330 and S340) in the method according to the present disclosure, the controller may determine that the power generation amounts of the respective fuel cells are in the equal state, when differences between the actual power generation amounts of the respective fuel cells are within a predetermined reference range (S310).

This operation may be understood as an operation of confirming whether or not the power generation amounts of the multiple fuel cells are actually equally controlled by comparing the respective power generation amounts of the respective fuel cells with each other.

Since the power generation amounts of the fuel cells are changed over time while tracking the power generation control value, there may be a certain amount of error of measurement.

That is, the predetermined reference range may be understood as a reference range for determining that the power generation amounts of the respective fuel cells are equal when differences between the respective fuel cells are within a designated range, even though the differences between the respective fuel cells are caused by such an error.

For example, when the differences between the power generation amounts of the respective fuel cells are within ±2%, it may be determined that the power generation amounts of the respective fuel cells are equal.

Consequently, by confirming whether or not the power generation amounts of the respective fuel cells are in the equal state depending on the predetermined reference range, it may be confirmed whether or not the powers of the respective fuel cells are actually in the equal state, and differences between the progression degrees of progression of the respective fuel cells may be more clearly determined by confirming voltage differences in this state.

Further, in determining whether or not differential control of the power generation amounts of the respective fuel cells is required (S310, S320, S330 and S340) in the method according to the present disclosure, the controller may determine that the power generation amounts of the respective fuel cells are in the equal state, when differences between the actual power generation amounts of the respective fuel cells and the power generation control values thereof are within a predetermined error range (S320).

This operation may be understood as an operation of confirming whether or not the power generation amounts of the multiple fuel cells properly track the power generation control values.

Since the power generation control value indicates a value acquired by multiplying the total target output of the fuel cells by the power generation rate of each fuel cell, in order to satisfy the output required by the user of the fuel cell vehicle (or target output), it is necessary to confirm whether or not the power generation amounts of the multiple fuel cells properly track the power generation control values.

Therefore, in this operation, the differences between the actual power generation amounts of the respective fuel cells and the power generation control values thereof are derived by comparing the actual power generation amounts of the respective fuel cells with the power generation control values thereof, and it is determined that the power generation amounts of the respective fuel cells are in the equal state, when the differences are within the predetermined error range.

Here, the power generation control values of the respective fuel cells are set to the same value, and thus, it may be determined that the power generation amounts of the respective fuel cells are in the equal state merely by comparing the actual power generation amounts of the respective fuel cells with the power generation control values thereof.

Of course, as described above, it may be determined that the power generation amounts of the respective fuel cells are in the equal state, when the differences between the actual power generation amounts of the respective fuel cells are within the predetermined reference range (S310), but the target output may not be satisfied when the actual power generation amounts of the multiple fuel cells are equal but the actual power generation amounts of the respective fuel cells are severely different from the power generation control values thereof.

Therefore, in this operation, not only whether or not the power generation amounts of the respective fuel cells are equally controlled but also whether or not the target output is properly satisfied in the state in which the power generation amounts of the respective fuel cells are equal may be confirmed. Thereby, the power generation amounts of the respective fuel cells may be equally controlled without influencing the driving performance of the fuel cell vehicle.

For reference, the predetermined error range may be understood as a reference range for determining that the actual power generation amounts of the respective fuel cells properly track the power generation control values thereof when differences between the actual power generation amounts of the respective fuel cells and the power generation control values thereof are within a designated range, even though there are the differences between the actual power generation amounts of the respective fuel cells and the power generation control values thereof.

In determining whether or not differential control of the power generation amounts of the respective fuel cells is required (S310, S320, S330 and S340) in the method according to the present disclosure, the controller may determine that differential control of the power generation amounts of the respective fuel cells is required, when differences between the output voltages of the respective fuel cells exceed a predetermined reference value (S330).

In the present disclosure, the deterioration states of the respective fuel cells are determined based on voltage drop incurred due to the progression degrees of deterioration of the respective fuel cells and accordingly differential control is executed, and therefore, when the differences between the output voltages of the respective fuel cells are excessively great, it may be determined that there is a fuel cell which is relatively more deteriorated.

For example, in a fuel cell vehicle in which two fuel cells are mounted, when a difference between the output voltages of the two fuel cells is excessively great, it may be determined that the deterioration state of one fuel cell is worse than the deterioration state of the other fuel cell.

Further, whether or not the differences between the output voltages of the respective fuel cells are excessively great is determined depending on whether or not the differences exceed the predetermined reference value.

Here, the predetermined reference value may be understood as a kind of determination value for determining whether or not the differences between the output voltages of the respective fuel cells are excessively great and thus differential control of the power generation amounts of the respective fuel cells is required.

For example, when the differences between the output voltages of the respective fuel cells exceed 3V, it may be determined that the differences between the output voltages of the respective fuel cells are excessively great. For reference, such a reference value may be set differently depending on the specifications, design conditions and service environment of the fuel cells, etc., and may be quantified through a plurality of experiments and may be stored in a memory (not shown) of the controller according to the present disclosure.

Consequently, the controller may estimate the deterioration states of the respective fuel cells by comparing the differences between the respective fuel cells with the predetermined reference value, and thereby, differential control of the power generation amounts of the respective fuel cells may be appropriately performed when needed.

In determining whether or not differential control of the power generation amounts of the respective fuel cells is required (S310, S320, S330 and S340) in the method according to the present disclosure, the controller may maintain the current set power generation control value, upon determining that differential control of the power generation amounts of the respective fuel cells is not required (S340).

The controller determines that differential control of the power generation amounts of the respective fuel cells is not required, when the differences between the output voltages of the respective fuel cells do not exceed the predetermined reference value.

In this case, it is not necessary to perform differential control of the power generation amounts of the respective fuel cells, and thus, the controller according to the present disclosure maintains the current set power generation control value.

For reference, when differential control of the power generation amounts of the respective fuel cells is performed, the power generation control values of the respective fuel cells are corrected, differential control of the power generation amounts of the respective fuel cells is performed based on the corrected power generation control values, and then, it is re-determined whether or not differential control of the power generation amounts of the respective fuel cells is required (S600).

Also in this case, the controller according to the present disclosure may determine that differential control of the power generation amounts of the respective fuel cells is not required, when the differences between the output voltages of the respective fuel cells do not exceed the predetermined reference value, and may maintain the corrected power generation control values.

Subsequently, unless the target output of the fuel cell vehicle is changed, the current set power generation control value may be continuously maintained (S700). The reason for this is that, when the target output of the fuel cell vehicle is changed (for example, when the user of the vehicle attempts to accelerate the vehicle), the power generation control values defined as values acquired by multiplying the total target output of the fuel cells by the power generation rates of the respective fuel cells should also be changed.

Therefore, when the target output of the fuel cell vehicle is changed, the method according to the present disclosure may return to the first operation so that equal control of the power generation amounts of the respective fuel cells is performed again, and differential control is performed again upon determining that differential control is required after equal control.

That is, although the target output of the fuel cell vehicle is changed for various reasons during driving, the progression degrees of deterioration and the deterioration speeds of the multiple fuel cells may be equally managed.

In correcting the power generation control values of the respective fuel cells depending on the differences between the output voltages of the respective fuel cells (S410 and S420), the controller may determine differences between the deterioration degrees of the respective fuel cells through comparison between the output voltages of the respective fuel cells (S410), and may correct the power generation control values of the respective fuel cells depending on the differences between the deterioration degrees of the respective fuel cells (S420).

Concretely, in correcting the power generation control values of the respective fuel cells depending on the differences between the output voltages of the respective fuel cells (S410 and S420), the controller may determine a fuel cell having high output voltage as having a low deterioration degree, and may determine a fuel cell having low output voltage as having a high deterioration degree.

As described above with reference to FIGS. 5A and 5B, as the deterioration states of the respective fuel cells become severe, the output voltages thereof drop at the same current, and thus, the output voltage of the fuel cell which is relatively more deteriorated becomes lower than the output voltage of the fuel cell which is relatively less deteriorated.

That is, the controller according to the present disclosure may determine that the fuel cell having high output voltage has a low deterioration degree, and may determine that the fuel cell having low output voltage has a high deterioration degree, through comparison between the output voltages of the respective fuel cells.

Further, the controller corrects the power generation control values of the respective fuel cells depending on the differences between the deterioration degrees of the respective fuel cells, and performs differential control depending on the corrected power generation control values.

More concretely, in correcting the power generation control values of the respective fuel cells depending on the differences between the output voltages of the respective fuel cells (S410 and S420), the controller may derive a correction value based on results of comparison between the output voltages of the respective fuel cells, and may correct the power generation control values of the respective fuel cells based on the derived correction value. Here, a detailed principle of deriving the correction value and a method for deriving the correction value will be described later.

The correction value may be added to the power generation control value of the fuel cell having the low deterioration degree, and may be subtracted from the power generation control value of the fuel cell having the high deterioration degree.

That is, the fuel cell having the low deterioration degree is controlled such that the power generation amount thereof is increased by adding the derived correction value to the existing power generation control value thereof, and the fuel cell having the high deterioration degree is controlled such that the power generation amount thereof is decreased by subtracting the derived correction value from the existing power generation control value thereof.

That is, as shown in the graph shown in FIG. 5B, the power generation output (or the power production amount) of the fuel cell which is relatively more deteriorated may be decreased (i.e., the area of region P may be decreased), and the power generation output (or the power production amount) of the fuel cell which is relatively less deteriorated may be increased (i.e., the area of region O may be increased).

Hereinafter, the principle of deriving the correction value will be described based on a fuel cell vehicle in which two fuel cells are mounted.

Concretely, in correcting the power generation control values of the respective fuel cells depending on the differences between the output voltages of the respective fuel cells (S410 and S420), the correction value may be derived as the proportion of a difference between the output voltages of the two fuel cells to the total available output voltage of the fuel cells. Further, the controller may derive a first power generation control value by correcting the power generation control value of one fuel cell based on the derived correction value as the corrected power generation control value of the corresponding fuel cell, and may derive the corrected power generation control value of the other fuel cell by subtracting the first power generation control value from the total target output of the fuel cells.

For example, when the total available output voltage of the two fuel cells is 100V and the differences between the output voltages of the respective fuel cells is 5V, the correction value is derived as 5%. The power generation control values of the respective fuel cells are corrected by adding and subtracting the derived correction value to and from the existing power generation control values of the respective fuel cells.

More concretely, in equal control of the power generation amounts of the respective fuel cells, the existing power generation control values of the respective fuel cells are calculated by multiplying the total target output of the fuel cells by the power generation rate of 50%.

Here, in case that the output voltage of one fuel cell is high and thus the fuel cell is determined to have a low deterioration degree, the corrected power generation control value is derived as the first power generation control value acquired by multiplying the total target output of the fuel cells by a value (55%) acquired by adding the correction value (5%) to the existing power generation control value of the corresponding fuel cell (50%).

On the other hand, in case that the output voltage of one fuel cell is low and thus the fuel cell is determined to have a high deterioration degree, the corrected power generation control value is derived as the first power generation control value acquired by multiplying the total target output of the fuel cells by a value (45%) acquired by subtracting the correction value (5%) from the existing power generation control value of the corresponding fuel cell (50%).

Then, the corrected power generation control value of the other fuel cell is derived by subtracting the first power generation control value from the total target output of the fuel cells.

For example, in the case in which the correction value is derived in the same manner as the above example and the total target output of the fuel cells is 200 W, when it is determined that one fuel cell has a low deterioration degree, the corrected power generation control value of the fuel cell is derived as the first power generation control value, i.e., 110 W (200 W×55%), and the corrected power generation control value of the other fuel cell is derived as 90 W acquired by subtracting the first power generation control value from 200 W.

On the other hand, in the case in which the total target output of the fuel cells is 200 W, when it is determined that one fuel cell has a high deterioration degree, the corrected power generation control value of the fuel cell is derived as the first power generation control value, i.e., 90 W (200 W×45%), and the corrected power generation control value of the other fuel cell is derived as 110 W acquired by subtracting the first power generation control value from 200 W.

In this way, the power generation amounts of the respective fuel cells are differentially controlled depending on the deterioration states thereof, thereby being capable of equally maintaining the progression speeds of deterioration of the respective fuel cells while maintaining the total target output of the fuel cells.

In differentially controlling the power generation amounts of the respective fuel cells (S510 and S520) in the method according to the present disclosure, the controller may maintain the corrected power generation control values for a predetermined reference time (S520).

This operation may be understood as an operation for securing a time taken to perform differential control depending on the corrected power generation control values. This will be described in detail with reference to FIGS. 3A to 3C.

FIGS. 3A to 3C are graphs showing power generation amounts, voltages and power generation rates of respective fuel cells over time, in the case in which differential control of multiple fuel cells according to the present disclosure is applied. For reference, FIGS. 3A to 3C are illustrated assuming that two fuel cells are provided, and this configuration is provided only for enhancement of understanding of particular example embodiments of the present disclosure, and is not intended to be limiting.

In the graph shown in FIG. 3A, A is a curve representing relationships between a power generation amount and time depending on a power generation control value, B is a curve representing the actual power generation amount change of a fuel cell which is relatively less deteriorated over time, C is a curve representing the actual power generation amount change of a fuel cell which is relatively more deteriorated over time, A1 is a curve representing relationships between a power generation amount and time depending on a corrected power generation control value corresponding to the curve B, and A2 is a curve representing relationships between a power generation amount and time depending on a corrected power generation control value corresponding to the curve C.

Further, in the graph shown in FIG. 3B, D is a curve representing the voltage change of the fuel cell which is relatively less deteriorated over time, and E is a curve representing the voltage change of the fuel cell which is relatively more deteriorated over time.

In addition, in the graph shown in FIG. 3C, F is a curve representing the power generation rate of the fuel cell which is relatively less deteriorated. For reference, times in the respective graphs are independently changed, and it may be preferably understood that times in the respective graphs do not relate to each other, and individually elapse.

First, referring to the graph shown in FIG. 3B, among the voltages of the respective fuel cells, drop of the voltage of the fuel cell which is relatively more deteriorated gets worse due to differences between the deterioration states of the respective fuel cells as time passes.

At this time, differential control of the power generation is performed by correcting the power generation control values of the respective fuel cells depending on the deterioration states of the respective fuel cells. Concretely, referring to FIG. 3A, the fuel cell which is relatively less deteriorated (in curve B) is controlled so that the power generation control value thereof is increased so as to exhibit higher output than the existing output (in curve A1). On the contrary, the fuel cell which is relatively more deteriorated (in curve C) is controlled so that the power generation control value thereof is decreased so as to exhibit lower output than the existing output (in curve A2).

Further, referring to the graph shown in FIG. 3A, it may be confirmed that a designated time is taken for the power generation amounts of the fuel cells to track the power generation control values thereof (i.e., indicating that curves B and C track curves A1 an A2, respectively).

That is, although the power generation control values of the respective fuel cells are corrected depending on the deterioration states thereof, differential control depending on the corrected power generation control values may be performed only after the designated time passes.

Therefore, in the present disclosure, the controller may maintain the corrected power generation control values for the predetermined reference time so as to more definitely perform differential control. Further, the method according to the present disclosure includes maintaining the corrected power generation control values for the predetermined reference time (S520), thereby being capable of confirming whether or not differential control has been performed in a separate operation which will be described later.

For reference, the predetermined reference time may be understood as a set time which is quantified through a plurality of experiments on a time taken for the power generation amounts of the respective fuel cells to track the corrected power generation control values, and is stored. Such a set time may be stored in the memory (not shown) of the controller.

The method according to the present disclosure may further include re-determining whether or not differential control of the power generation amounts of the respective fuel cells is required, when differences between the actual power generation amounts of the respective fuel cells and the corrected power generation control values thereof are within the predetermined error range (S600), after differentially controlling the power generation amounts of the respective fuel cells (S510 and S520).

This operation may be understood as an operation of confirming whether or not differential control of the power generation amounts of the respective fuel cells has been properly performed.

Referring to FIG. 5B, when differential control of the power generation amounts of the respective fuel cells has been properly performed, the voltages of the respective fuel cells are equally controlled. This may be confirmed through the graph shown in FIG. 3B.

Therefore, it may be determined whether or not differential control of the power generation amounts of the respective fuel cells has been properly performed by comparing differences between the output voltages of the respective fuel cells with the predetermined reference value.

Concretely, when the differences between the output voltages of the respective fuel cells exceed the predetermined reference value, the controller recognizes that differential control has not been properly performed, and thus determines that differential control is additionally required. A process of additionally performing differential control is the same as the above-described process of performing differential control, and a detailed description thereof will thus be omitted because it is considered to be unnecessary.

When the differences between the output voltages of the respective fuel cells do not exceed the predetermined reference value, the controller recognizes that differential control has been properly performed, and thus maintains the current power generation control values of the respective fuel cells.

Here, unless the target output of the fuel cell vehicle is changed, the current set power generation control values may be continuously maintained, and this operation was already described above, and a detailed description thereof will thus be omitted because it is considered to be unnecessary.

Therefore, in the method according to the present disclosure, the progression speeds of deterioration of the respective fuel cells may be equally managed through differential control of the power generation amounts of the respective fuel cells depending on differences between the progression degrees of deterioration of the respective fuel cells so as to improve endurance lives of the respective fuel cells, the fuel cell replacement period of the fuel cell vehicle having the multiple fuel cells mounted therein may be extended so as to reduce the idle period of the vehicle caused by replacement, and the endurance lives of the respective fuel cells may be over at the same point in time due to equal management of the progression speeds of deterioration of the multiple fuel cells so as to reduce unnecessary maintenance costs incurred due to replacement of all the fuel cells including a fuel cell which is relatively less deteriorated at the same time.

As is apparent from the above description, a method for controlling multiple fuel cells of a fuel cell vehicle according to the present disclosure has the following effects.

First, the progression speeds of deterioration of the respective fuel cells are equally managed through differential control of the power generation amounts of the respective fuel cells depending on differences between the progression degrees of deterioration of the respective fuel cells, thereby being capable of improving endurance lives of the respective fuel cells.

Second, the fuel cell replacement period of the fuel cell vehicle having the multiple fuel cells mounted therein is extended due to increase in the endurance lives of the respective fuel cells, thereby being capable of reducing the idle period of the vehicle caused by replacement.

Third, the endurance lives of the respective fuel cells are over at the same point in time due to equal management of the progression speeds of deterioration of the multiple fuel cells, thereby being capable of reducing unnecessary maintenance costs incurred due to replacement of all the fuel cells including a fuel cell which is relatively less deteriorated at the same time.

Although the exemplary embodiments of the present disclosure have been disclosed for illustrative purposes, those skilled in the art will appreciate that various modifications, additions and substitutions are possible, without departing from the scope and spirit of the disclosure as disclosed in the accompanying claims.

The invention claimed is:

1. A method for controlling multiple fuel cells of a fuel cell vehicle, the method comprising:
   equally controlling, by a controller, power generation amounts of each of the fuel cells;
   deriving, by the controller, differences between output voltages of each of the fuel cells in a state in which the power generation amounts of each of the fuel cells are equal, and determining whether or not differential control of the power generation amounts of each of the fuel cells is required based on the differences between the output voltages of each of the fuel cells;
   correcting, by the controller, power generation control values of each of the fuel cells depending on the differences between the output voltages of each of the fuel cells; and
   differentially controlling, by the controller, the power generation amounts of each of the fuel cells depending on the corrected power generation control values;

wherein, in the correcting the power generation control values of each of the fuel cells depending on the differences between the output voltages of each of the fuel cells, the controller determines differences between deterioration degrees of each of the fuel cells through comparison between the output voltages of each of the fuel cells, and corrects the power generation control values of each of the fuel cells depending on the differences between the deterioration degrees of each of the fuel cells.

2. The method according to claim 1, wherein, in the equally controlling the power generation amounts of each of the fuel cells, the controller sets the power generation control values of each of the fuel cells to the same value, and equally controls the power generation amounts of each of the fuel cells depending on the set power generation control value.

3. The method according to claim 1, wherein, in the determining whether or not differential control of the power generation amounts of each of the fuel cells is required, the controller determines that the power generation amounts of each of the fuel cells are in an equal state, when differences between actual power generation amounts of each of the fuel cells are within a predetermined reference range.

4. The method according to claim 1, wherein, in the determining whether or not differential control of the power generation amounts of each of the fuel cells is required, the controller determines that the power generation amounts of each of the fuel cells are in an equal state, when differences between actual power generation amounts of each of the fuel cells and the power generation control values are within a predetermined error range.

5. The method according to claim 1, wherein, in the determining whether or not differential control of the power generation amounts of each of the fuel cells is required, the controller determines that differential control of the power generation amounts of each of the fuel cells is required, when the differences between the output voltages of each of the fuel cells exceed a predetermined reference value.

6. The method according to claim 5, wherein, in the determining whether or not differential control of the power generation amounts of each of the fuel cells is required, the controller maintains the current set power generation control value, upon determining that differential control of the power generation amounts of each of the fuel cells is not required.

7. The method according to claim 1, wherein, in the correcting the power generation control values of each of the fuel cells depending on the differences between the output voltages of each of the fuel cells, the controller determines a fuel cell having high output voltage as having a low deterioration degree, and determines a fuel cell having low output voltage as having a high deterioration degree.

8. The method according to claim 1, wherein, in the correcting the power generation control values of each of the fuel cells depending on the differences between the output voltages of each of the fuel cells, the controller derives a correction value based on results of comparison between the output voltages of each of the fuel cells, and corrects the power generation control values of each of the fuel cells based on the derived correction value.

9. The method according to claim 8, wherein:
the multiple fuel cells are two fuel cells; and
in the correcting the power generation control values of each of the fuel cells depending on the differences between the output voltages of each of the fuel cells, the correction value is derived as a proportion of a difference between output voltages of the two fuel cells to a total available output voltage of the two fuel cells.

10. The method according to claim 8, wherein:
the multiple fuel cells are two fuel cells; and
in the correcting the power generation control values of each of the fuel cells depending on the differences between the output voltages of each of the fuel cells, the controller derives a first power generation control value by correcting the power generation control value of one fuel cell based on the derived correction value as a corrected power generation control value of the corresponding fuel cell, and derives a corrected power generation control value of a remaining fuel cell by subtracting the first power generation control value from a total target output of each of the fuel cells.

11. The method according to claim 1, wherein, in the differentially controlling the power generation amounts of each of the fuel cells, the controller maintains the corrected power generation control values of each of the fuel cells for a predetermined reference time.

12. The method according to claim 11, further comprising re-determining whether or not differential control of the power generation amounts of each of the fuel cells is required, when differences between actual power generation amounts of each of the fuel cells and the corrected power generation control values are within a predetermined error range, after the differentially controlling the power generation amounts of each of the fuel cells.

* * * * *